(12) United States Patent
Hsu et al.

(10) Patent No.: US 12,493,215 B2
(45) Date of Patent: Dec. 9, 2025

(54) BACKLIGHT MODULE AND DISPLAY DEVICE

(71) Applicant: RADIANT OPTO-ELECTRONICS CORPORATION, Kaohsiung (TW)

(72) Inventors: Yu-En Hsu, Kaohsiung (TW); Yun-Jui Shieh, Kaohsiung (TW); Teng-Yi Huang, Kaohsiung (TW); Yung-Chieh Chao, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 18/909,600

(22) Filed: Oct. 8, 2024

(65) Prior Publication Data
US 2025/0028202 A1    Jan. 23, 2025

Related U.S. Application Data

(63) Continuation of application No. PCT/CN2023/081497, filed on Mar. 15, 2023.

(30) Foreign Application Priority Data

Feb. 8, 2023   (CN) .......................... 202310084756.8

(51) Int. Cl.
*G02F 1/13357*   (2006.01)
*F21V 8/00*   (2006.01)

(52) U.S. Cl.
CPC ..... *G02F 1/133608* (2013.01); *G02B 6/0091* (2013.01); *G02B 6/0093* (2013.01); *G02F 1/133615* (2013.01)

(58) Field of Classification Search
CPC ........................... G02B 6/0091; G02B 6/0093
See application file for complete search history.

(56) References Cited

U.S. PATENT DOCUMENTS

| 11,353,648 | B2 * | 6/2022 | Zhang | G02B 6/0088 |
| 2013/0215363 | A1 | 8/2013 | Zhang | |
| 2013/0308074 | A1 | 11/2013 | Park et al. | |
| 2015/0212262 | A1 * | 7/2015 | Chiang | G02B 6/0093 |
| | | | | 362/611 |

FOREIGN PATENT DOCUMENTS

| CN | 103574408 A | 2/2014 |
| CN | 104806921 A | 7/2015 |

(Continued)

OTHER PUBLICATIONS

International Search Report (PCT/ISA/210) issued in PCT/CN2023/081497, dated Oct. 23, 2023.

(Continued)

*Primary Examiner* — Keith G. Delahoussaye
(74) *Attorney, Agent, or Firm* — Birch, Stewart, Kolasch & Birch, LLP

(57) ABSTRACT

A backlight module is provided and includes a side wall, a cushion member, and a light guide plate. The cushion member has a lower portion and a side portion extending from the lower portion, and the side portion abuts against the side wall, and the light guide plate is mounted on the cushion member. A display device is provided and includes the aforementioned backlight module, using the cushion member to support the light guide plate.

12 Claims, 4 Drawing Sheets

(56) References Cited

FOREIGN PATENT DOCUMENTS

| | | | | |
|---|---|---|---|---|
| CN | 112987403 A | * | 6/2021 | ....... G02F 1/133615 |
| CN | 214067426 U | | 8/2021 | |
| CN | 216013726 U | | 3/2022 | |
| CN | 217606120 U | * | 10/2022 | |
| CN | 115877501 A | | 3/2023 | |
| KR | 10-2006-0049576 A | | 5/2006 | |
| KR | 10-2016-0035159 A | | 3/2016 | |
| KR | 10-2018-0024629 A | | 3/2018 | |
| TW | 201616186 A | | 5/2016 | |
| TW | 201806196 A | | 2/2018 | |
| TW | I780937 B | | 10/2022 | |
| WO | WO 2023/050371 A1 | | 4/2023 | |

OTHER PUBLICATIONS

Extended European Search Report for European Application No. 23920596.6 dated Oct. 17, 2025.

\* cited by examiner

BACKLIGHT MODULE AND DISPLAY DEVICE

CROSS-REFERENCE TO RELATED APPLICATIONS

This application is a continuation application of international Application No. PCT/CN2023/081497 filed on Mar. 15, 2023, which claims priority from China Patent Application Serial Number 202310084756.8, filed on Feb. 8, 2023. The entire contents of each of which are incorporated herein by reference.

FIELD OF INVENTION

The present disclosure relates to a backlight module and a display device, in particular to a backlight module capable of preventing optical components from being displaced upward, and to a display device equipped with this backlight module.

BACKGROUND OF THE INVENTION

Backlight modules can be used in general displays, automotive displays, and wearable devices such as virtual reality (VR) or augmented reality (AR) devices. Backlight modules can be further categorized into edge-lit backlight modules or direct-lit backlight modules based on the position of the light-emitting units. The edge-lit backlight module typically includes: a frame structure, a light guide plate, and a light bar. The light guide plate and light bar are placed within the accommodating space of the frame structure, with the light bar directing light towards one side edge of the light guide plate, which then forms a planar light source through its light-emitting surface. Generally, the edge-lit backlight module uses rubber components to secure the light guide plate to the back cover. When the rubber component is placed on the back cover, its side wall is attached to the side wall of the back cover. When the light guide plate expands in a high-temperature environment, the rubber component, which is compressed by the light guide plate, will drive the light guide plate and the optical films and other optical components thereon to be displaced upward, causing interference and friction between the optical components and the frame, resulting in the generation of debris, and consequently causing problems with the light-emitting surface.

SUMMARY OF THE INVENTION

The present disclosure provides a backlight module capable of preventing optical components from being displaced upward, and a display device equipped with the backlight module. In particular, the backlight module supports the light guide plate through a cushion member, effectively solving the aforementioned problems.

According to an embodiment, the backlight module of the present disclosure comprises a side wall, a cushion member, and a light guide plate. The cushion member has a lower portion and a side portion extending from the lower portion, and the side portion abuts against the side wall. The light guide plate is mounted on the cushion member.

According to an embodiment, the backlight module of the present disclosure comprises a back cover, a cushion member, and a light guide plate. The back cover has a side wall. The cushion member has of a lower portion and a side portion extending from the lower portion, the lower portion is positioned on the back cover, and the side portion abuts against the side wall of the back cover to form a gap therebetween. The light guide plate is mounted on the cushion member.

According to another embodiment, the display device of the present disclosure comprises the aforementioned backlight module and a display, wherein the display is mounted on the backlight module.

In summary, when the lower portion of the cushion member of the present disclosure is placed, the side portion of the cushion member abuts against the side wall. When the light guide plate expands in a high-temperature environment, causing the cushion member to be compressed by the light guide plate, the deformation of the cushion member may prevent the light guide plate and the optical films and other optical components thereon from being displaced upward. This may prevent interference and friction between the optical components and the frame, back cover, or other structural components, thereby preventing the generation of debris and consequent problems with the light-emitting surface.

Besides, the side portion of the cushion member abuts against the side wall of the back cover to form a gap between the side portion of the cushion member and the side wall of the back cover, the gap may accommodate the deformation of the cushion member, so as to provide similar effect.

By the following detailed description and accompanying drawings, the advantages and spirit of the present disclosure will be further understood.

DETAILED DESCRIPTION OF THE PREFERRED EMBODIMENTS

Figure 1:
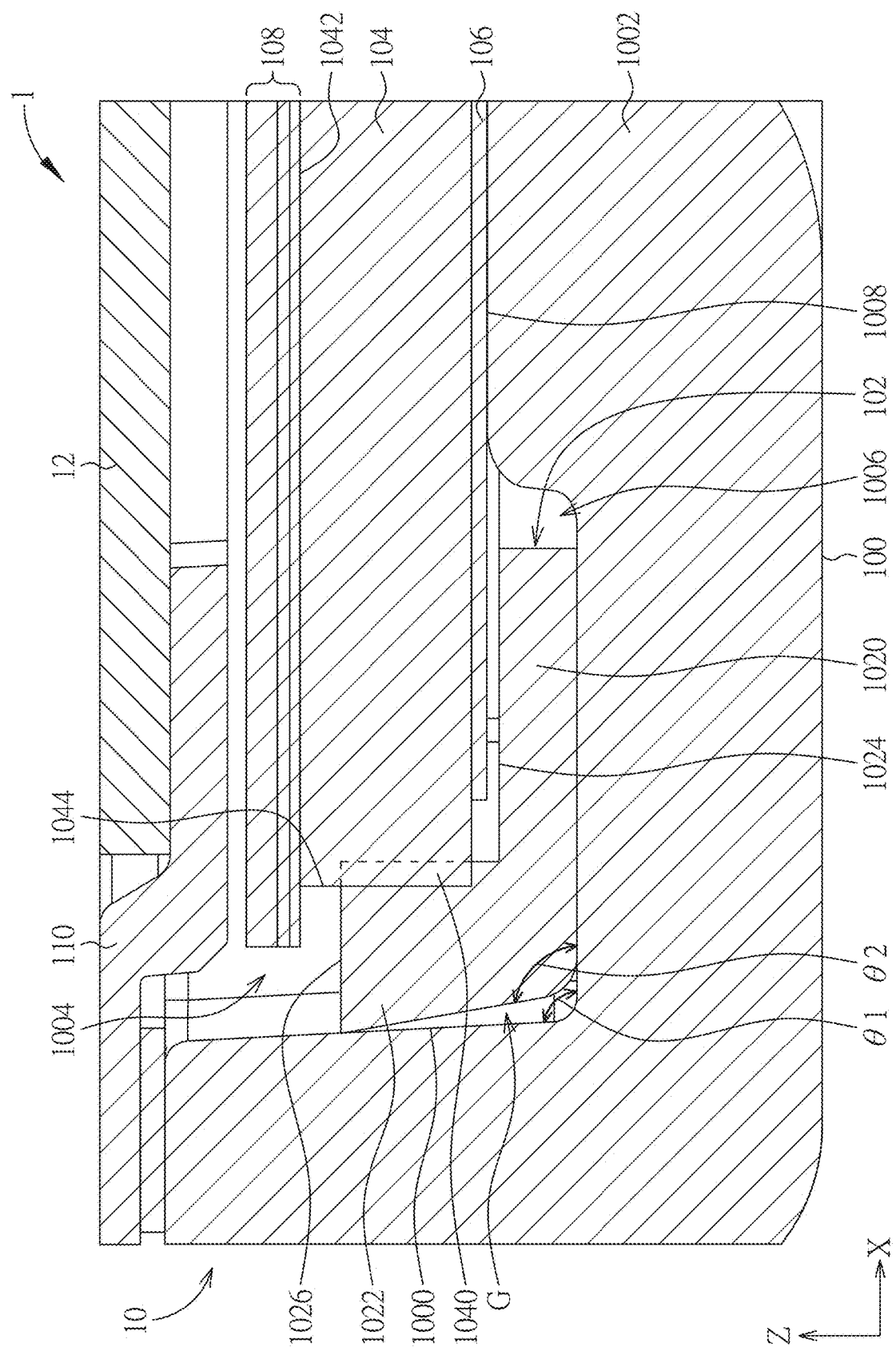
FIG. 1 is a partial cross-sectional view of the display device according to an embodiment of the present disclosure.
Figure 2:
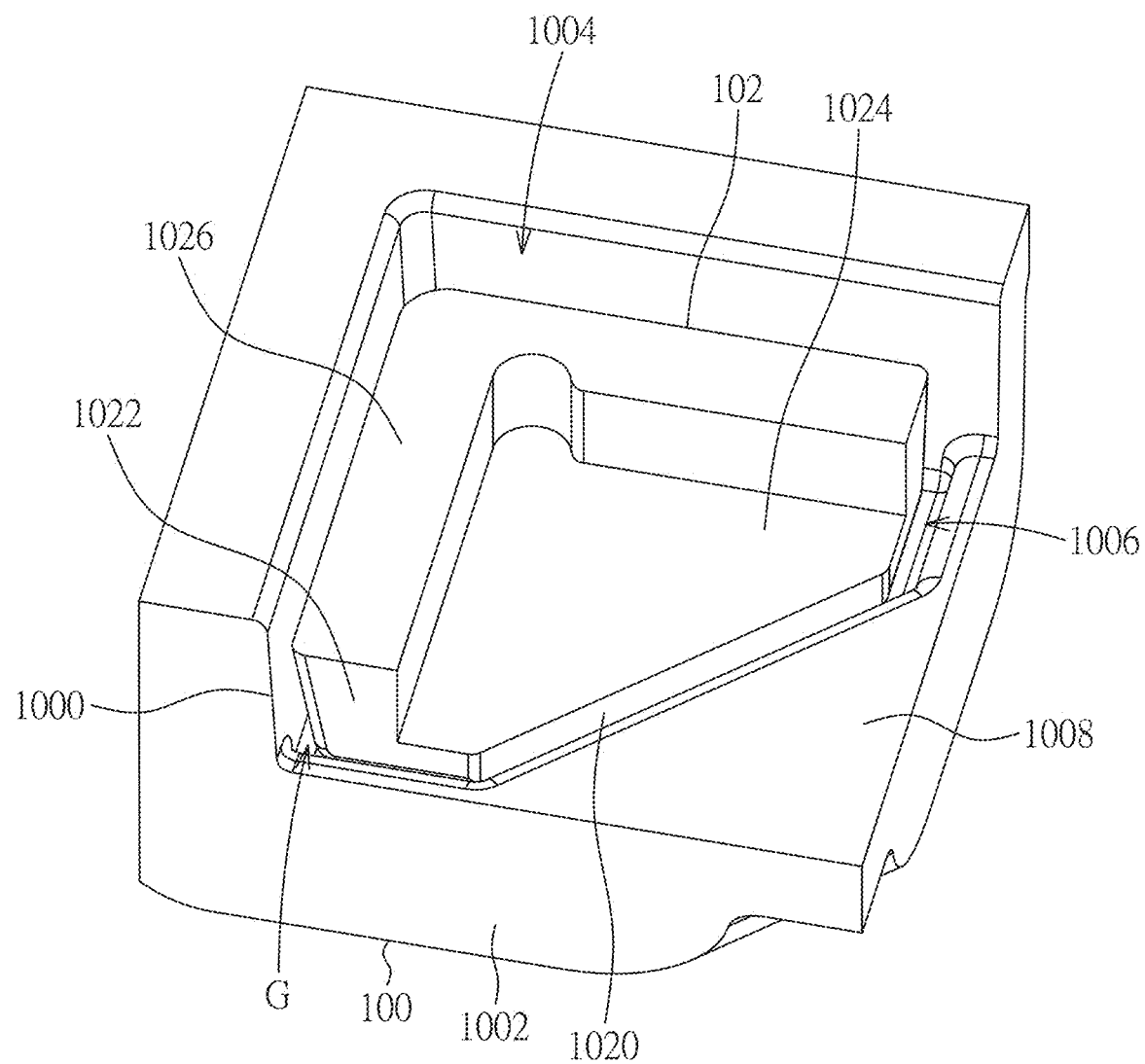
FIG. 2 is a stereoscopic view of the back cover and cushion member in FIG. 1.
Figure 3:
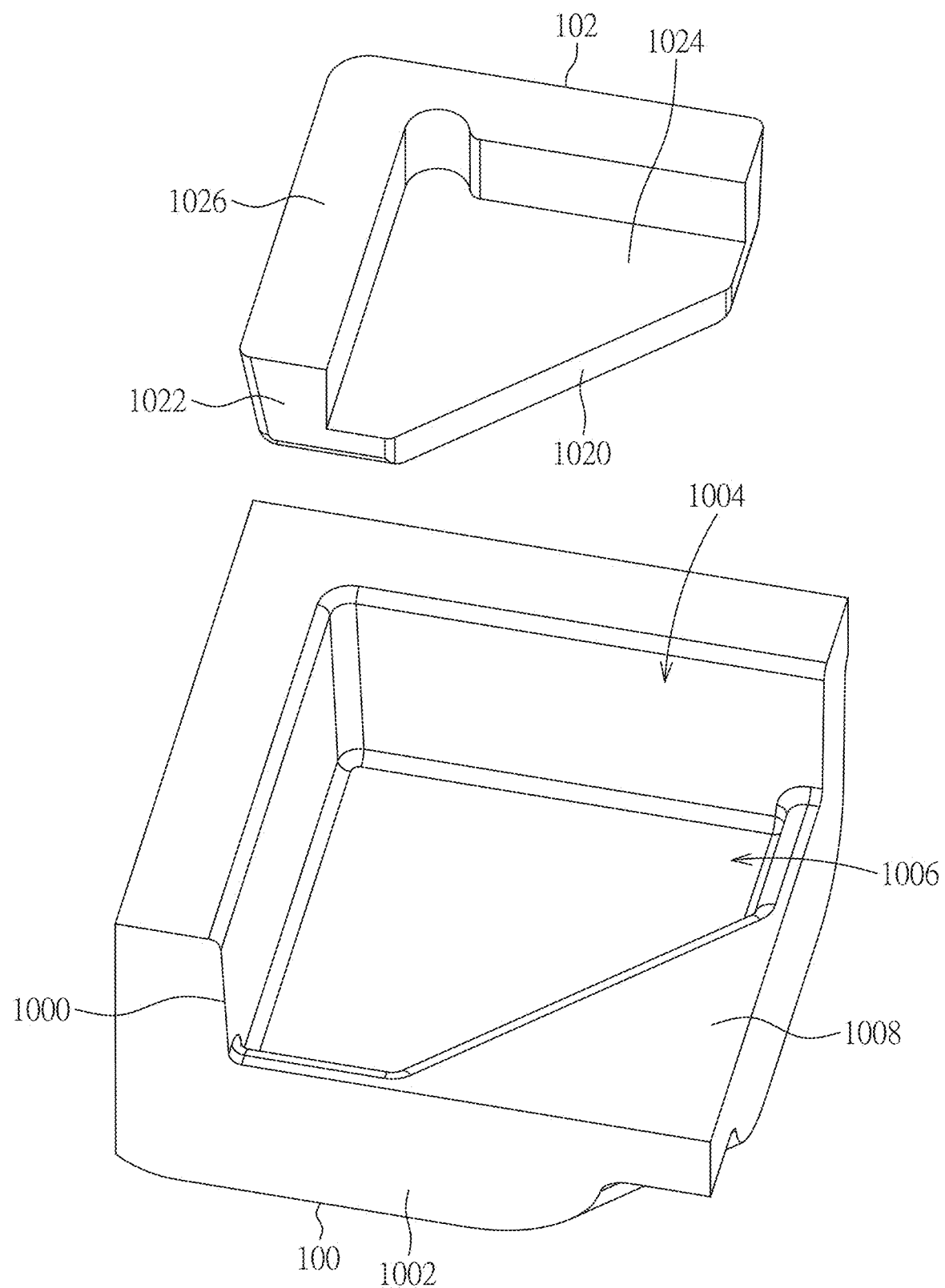
FIG. 3 is an exploded view of the back cover and cushion member in FIG. 2.

Reference is made to FIGS. 1 to 3, a backlight module 10 comprises a back cover 100, a cushion member 102, a light guide plate 104, a reflective sheet 106, an optical film stack 108, and a frame 110. The cushion member 102 is positioned on the back cover 100. The cushion member 102 may be made of rubber, but is not limited to this material. The light guide plate 104 is mounted on the cushion member 102, with the cushion member 102 capable of covering a corner 1040 of the light guide plate 104. In a practical application, four cushion members 102 may be placed at the four corners of the back cover 100 to cover the four corners 1040 of the light guide plate 104. The reflective sheet 106 is positioned between the light guide plate 104 and the back cover 100. The optical film stack 108 is mounted on the light guide plate 104. In a practical application, the optical films included in the optical film stack 108 may be prism sheets, diffusion sheets, etc., which are used to alter the optical characteristics of light. The frame 110 is mounted on the back cover 100 and positioned above the optical film stack 108. In a practical application, the backlight module 10 also includes a light source (not shown) positioned relative to the light guide plate 104.

As shown in FIGS. 1 to 3, the back cover 100 has a side wall 1000. In other practical designs, the back cover 100 may not have the side wall 1000. The side wall 1000 can be designed with the frame 110 or other member like as front chassis of the display device. The cushion member 102 has of a lower portion 1020 and a side portion 1022, and the side portion 1022 is extending from the lower portion 1020. The lower portion 1020 of the cushion member 102 is positioned on the back cover 100, and the side portion 1022 of the cushion member 102 abuts against the side wall 1000 of the back cover 100 to form a gap G between the side portion 1022 of the cushion member 102 and the side wall 1000 of the back cover 100. As shown in FIG. 1, the gap G may gradually narrow from the lower portion 1020 of the cushion member 102 along the side portion 1022 of the cushion member 102. Due to the gap G existing between the side portion 1022 of the cushion member 102 and the side wall 1000 of the back cover 100, when the light guide plate 104 expands in a high-temperature environment, causing the cushion member 102 to be compressed by the light guide plate 104, the gap G may accommodate the deformation of the cushion member 102, for preventing the light guide plate 104 and the optical film stack 108 and other optical components thereon from being displaced upward. This may prevent interference and friction between the optical components and the frame 110, back cover 100, or other structural components, thereby preventing the generation of debris and consequent problems with the light-emitting surface. More specifically, the cushion member 102 of the present disclosure not only serves the function of securing the light guide plate 104, but also maintains the light-emitting efficiency and optical quality of the light guide plate 104. When applied to automotive displays, it also improves the yield rate in high-temperature and low-temperature environmental tests, thereby reducing failure costs and increasing customer confidence, which is beneficial for model acceptance and customer base expansion.

In this embodiment, the back cover 100 may include a base 1002. The base 1002 and the side wall 1000 of the back cover 100 in combination are configured to form a space 1004 inside the backlight module 10, for accommodating the member such as the cushion member 102 inside the backlight module 10. The space 1004 may further receives the light guide plate 104, reflective sheet 106 and optical film stack 108. A first angle θ1 formed between the surface of the side wall 1000 of the back cover 100 facing the cushion member 102 and the surface of the base 1002. Furthermore, a second angle θ2 is formed between the surface of the cushion member 102 facing the side wall 1000 of the back cover 100 and the surface of the base 1002 of the back cover 100. The second angle θ2 is greater than the first angle θ1, which causes the gap G to gradually narrow from the lower portion 1020 of the cushion member 102 along the side portion 1022 of the cushion member 102. It should be noted that the second angle θ2 of the cushion member 102 is not based on the lower portion 1020 of the cushion member 102, but is based on the surface of the base 1002 of the back cover 100, which ensures that the second angle θ2 of the cushion member 102 and the first angle θ1 of the back cover 100 have the same reference point.

In other words, the first angle θ1 is the included angle formed within space 1004 and is formed between the surface of the base 1002 and the surface of the side wall 1000. The second angle θ2 is the included angle formed between the surface of the base 1002 and the surface of the side portion 1022 that faces the side wall 1000. In cross-sectional view of the display device, If the line formed by the surface of the base 1002 is used as a reference, the first angle θ1 and the second angle θ2 are corresponding angles, and the second angle θ2 is greater than the first angle θ1. Therefore, when the edge of the side wall 1022 of the cushion member 102, which is farthest from the base 1002, presses against the side wall 1000 of the back cover 100, a gap G may be formed therebetween.

More specifically, the first angle θ1 of the back cover 100 is formed in the space 1004 between the base 1002 and the side wall 1000, and the second angle θ2 is defined between the base 1002 of the back cover 100 and the side portion 1022 of the cushion member 102. Therefore, when the side portion 1022 of the cushion member leans to the side wall 1000 of the back cover 100, the gap G is formed therebetween. In this embodiment, the gradually narrowing gap G may be used to accommodate the deformation of the cushion member 102 along the Z-axis direction, thereby preventing the cushion member 102 from being pushed upward along the side wall 1000 of the back cover 100 by the light guide plate 104, thus preventing the generation of debris due to the pushing of the cushion member 102 or the light guide plate 104, which may lead to poor optical effects.

Additionally, the base 1002 may have a groove 1006, and the cushion member 102 may be placed in the groove 1006, the groove 1006 is used to restrict the position of the cushion member 102 to ensure that the cushion member 102 is not displaced, thereby preventing the light guide plate 104 from being pushed by the displaced cushion member 102 and generating debris that may affect the optical effect. In this embodiment, the groove 1006 is provided at the junction of the side wall 1000 and the base 1002 of the back cover 100, i.e., corresponding to the corner position of the optical components.

In this embodiment, the lower portion 1020 of the cushion member 102 has a first supporting surface 1024, and the base 1002 of the back cover 100 has a second supporting surface 1008. When the cushion member 102 is placed in the groove 1006 of the base 1002, the first supporting surface 1024 of the cushion member 102 and the second supporting surface 1008 of the back cover 100 may jointly support the light guide plate 104. More specifically, this embodiment indicates that the base 1002 of the back cover 100 is used to provide stable support for the light guide plate 104, thereby ensuring that the light guide plate 104 does not deform or warp. It should be noted that the first supporting surface 1024 of the cushion member 102 may also be lower than the second supporting surface 1008 of the back cover 100. In this case, the light guide plate 104 may be supported by the second supporting surface 1008 of the back cover 100, and the space between the first supporting surface 1024 and the bottom surface of the light guide plate 104 may be used to accommodate the reflective sheet 106 or a double-sided tape, thereby allowing the cushion member 102 to move along the X-axis direction relative to the back cover 100 or the reflective sheet 106 as the light guide plate 104 expands and contracts with temperature changes.

Furthermore, as seen in FIG. 1, in this embodiment, the lower portion 1020 and the side portion 1022 of the cushion member 102 are jointly clamped and confined by the back cover 100 and the light guide plate 104. This not only relatively secures the cushion member 102 to the back cover 100, but also creates some interference (as shown by the dotted line) between the side portion 1022 of the cushion member 102 and the light guide plate 104, which further enhances the stability of the positioning.

Additionally, the side portion 1022 of the cushion member 102 has a top surface 1026, and the light guide plate 104 has a light-emitting surface 1042. When the light guide plate 104 is mounted on the cushion member 102, the top surface 1026 of the cushion member 102 is lower than the light-emitting surface 1042 of the light guide plate 104, to avoid interference between the side portion 1022 of the cushion member 102 and the optical film stack 108. Moreover, when the light guide plate 104 is mounted on the cushion member 102, a side surface 1044 of the light guide plate 104 may interfere with the inner side surface of the side portion 1022 of the cushion member 102, which firmly secures the light guide plate 104 to the cushion member 102, thereby reducing the risk of scratching the bottom edge of the light guide plate 104, and ensuring optical quality.

Figure 4:
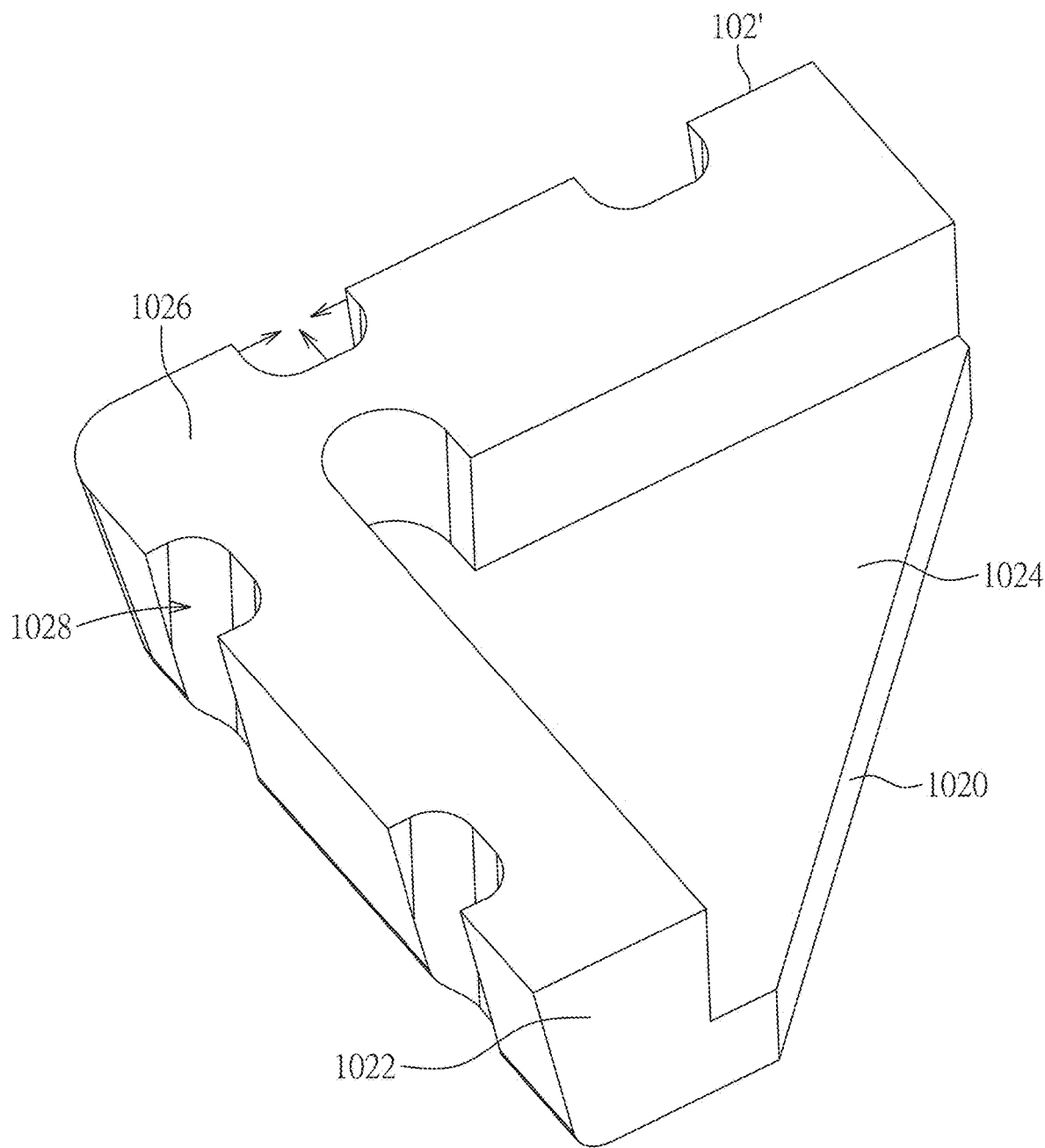
FIG. 4 is a stereoscopic view of the cushion member according to another embodiment of the present disclosure.

Reference is made to FIG. 4, which is a stereoscopic view of a cushion member 102' according to another embodiment of the present disclosure.

The aforementioned cushion member 102 may be replaced with the cushion member 102' shown in FIG. 4. The main difference between the cushion member 102' and the aforementioned cushion member 102 is that the surface of the side portion 1022 of the cushion member 102' facing the side wall 1000 of the back cover 100 (as shown in FIG. 1) has at least one groove 1028. In this embodiment, the at least one groove 1028 may extend from the top surface 1026 of the cushion member 102' to the lower portion 1020, but is not limited to this configuration. When the side portion 1022 of the cushion member 102' is laterally compressed by the light guide plate 104, the groove 1028 may provide more space for material deformation (as indicated by the arrow) to ensure that the light guide plate 104 and the optical film stack 108 and other optical components thereon are not displaced upward, thereby preventing indentation or damage to the light guide plate 104 due to excessive reactive force. It should be noted that the number, shape, and position of the grooves 1028 may be determined based on practical applications and are not limited to the embodiment shown in the drawings.

As shown in FIG. 1, the display device 1 of the present disclosure comprises the backlight module 10 and a display 12, with the display 12 mounted on the backlight module 10. In this embodiment, the display 12 is mounted on the frame 110. The display 12 may be, but is not limited to, a liquid crystal display.

In summary, the cushion member of the present disclosure is positioned on the back cover, with the side portion of the cushion member abutting against the side wall of the back cover, and the gap is formed between the side portion of the cushion member and the side wall of the back cover. When the light guide plate expands in the high-temperature environment, causing the cushion member to be compressed by the light guide plate, the gap may accommodate the deformation of the cushion member, thereby preventing the light guide plate, and the optical films and other optical components thereon from being displaced upward. This may prevent interference and friction between the optical components and the frame, back cover, or other structural components, thereby preventing the generation of debris and consequent problems with the light-emitting surface.

The above description represents only preferred embodiments of the present disclosure. All equivalent variations and modifications made within the scope of the present disclosure should be considered to be within the scope of the present disclosure.

REFERENCE SYMBOL LIST

1: display device
10: backlight module
12: display
100: back cover
1000: side wall
1002: base
1004: space
1006: groove
1008: second supporting surface
102, 102': cushion member
1020: lower portion
1022: side portion
1024: first supporting surface
1026: top surface
104: light guide plate
1040: corner
1042: light-emitting surface
1044: side surface
106: reflective sheet
108: optical film stack
110: frame
G: gap
X, Z: axis
θ1: first angle
θ2: second angle

What is claimed is:

1. A backlight module, comprising:
a side wall;
a cushion member, having of a lower portion and a side portion extending from the lower portion, and the side portion abutting against the side wall; and
a light guide plate, mounted on the cushion member;
wherein the side portion has an inner surface facing and abutting against the light guide plate, and the side portion has an inclined surface facing and abutting against the side wall to form a gap therebetween; and
wherein the gap gradually narrows from the lower portion of the cushion member along the side portion of the cushion member upward for accommodating a deformation of the cushion member caused by the light guide plate.

2. The backlight module according to claim 1, further comprising a back cover, the lower portion is disposed on the back cover.

3. The backlight module according to claim 2, wherein the back cover comprises a base and a space for accommodating the cushion member, the space is defined by the side wall and the base of the back cover, a first angle is formed between a surface of the side wall facing the cushion member and a surface of the base, a second angle is formed between a surface of the cushion member facing the side wall and the surface of the base, and the second angle is greater than the first angle.

4. The backlight module according to claim 1, wherein the cushion member covers a corner of the light guide plate with an interference fit existing between the side portion of the cushion member and the light guide plate.

5. The backlight module according to claim 1, wherein the side portion of the cushion member has a top surface, the light guide plate has a light-emitting surface, and the top surface is lower than the light-emitting surface.

6. The backlight module according to claim 2, wherein the back cover includes a base, the base has a groove, and the cushion member is placed in the groove.

7. The backlight module according to claim 6, wherein the lower portion of the cushion member has a first supporting surface, the base of the back cover has a second supporting surface, and the first supporting surface and the second supporting surface jointly support the light guide plate.

8. The backlight module according to claim 1, wherein the surface of the side portion of the cushion member facing the side wall has at least one groove.

9. The backlight module according to claim 8, wherein the side portion of the cushion member has a top surface, and the at least one groove extends from the top surface to the lower portion.

10. The backlight module according to claim 2, wherein both of the base and the side wall are a portion of the back cover.

11. The backlight module according to claim 3, wherein the first angle $\theta 1$ and the second angle $\theta 2$ are corresponding angles in a cross-sectional view when a line formed by the surface of the base of the back cover in the cross-sectional view is used as a reference.

12. A display device, comprising:
the backlight module according to claim 1; and
a display, mounted on the backlight module.

* * * * *